United States Patent [19]

Latorre et al.

[11] Patent Number: 4,826,143
[45] Date of Patent: May 2, 1989

[54] METHOD OF MANUFACTURING A SPRING OF THE CYLINDRICAL TYPE TO BE USED AT HIGH TEMPERATURE

[75] Inventors: Bernard Latorre, Vincennes; Claude Foucher, Palaiseau, both of France

[73] Assignee: U.S. Philips Corporation, New York, N.Y.

[21] Appl. No.: 232,550

[22] Filed: Aug. 12, 1988

Related U.S. Application Data

[63] Continuation of Ser. No. 921,925, Oct. 20, 1986, abandoned.

[30] Foreign Application Priority Data

Oct. 22, 1985 [FR] France ................................ 85 15653

[51] Int. Cl.$^4$ .............................................. F16F 1/36
[52] U.S. Cl. .................................. 267/148; 125/16 R; 29/173; 264/67; 267/149
[58] Field of Search ................................ 423/448; 29/173; 264/67; 125/16 R; 267/148, 149, 182, 47

[56] References Cited

U.S. PATENT DOCUMENTS

| 1,557,958 | 10/1925 | Anderson . | |
| 2,852,424 | 9/1958 | Reinhart | 29/173 |
| 2,854,230 | 9/1958 | Jones et al. | 267/149 |
| 2,888,258 | 5/1959 | Hoffstrom . | |
| 4,092,972 | 6/1978 | Schmid | 125/16 R |
| 4,400,433 | 8/1983 | Ishiguro | 423/448 |
| 4,513,544 | 4/1985 | Lossi | 125/15 |
| 4,650,619 | 3/1987 | Watanabe | 264/67 |
| 4,669,172 | 6/1987 | Petruzzi | 29/173 |

FOREIGN PATENT DOCUMENTS

| 761814 | 6/1967 | Canada | 267/182 |
| 1090004 | 3/1955 | France . | |
| 22436 | 2/1982 | Japan | 267/182 |

Primary Examiner—Robert P. Olszewski
Attorney, Agent, or Firm—Paul R. Miller

[57] ABSTRACT

The invention relates to a method of manufacturing a spring (10) of the cylindrical type to be used at high temperatures. This spring (10) is made of refractory material, such as quartz, boron nitride or graphite. It is constituted by recesses ($11_1$ to $11_7$) not adjoining each other, having a height h and which are distributed along a helical line. The method of manufacturing utilizes a wire saw for forming these recesses in a cylindrical tube, which is subjected to a rotation after each sawing operation. The absence of microcracks imparts a high elasticity to the spring up to high temperatures. It is used for transmitting movements at high temperatures, more particularly when conditions of perfect cleanliness are desired, as, for example, in the case of semiconductor metallurgy.

14 Claims, 4 Drawing Sheets

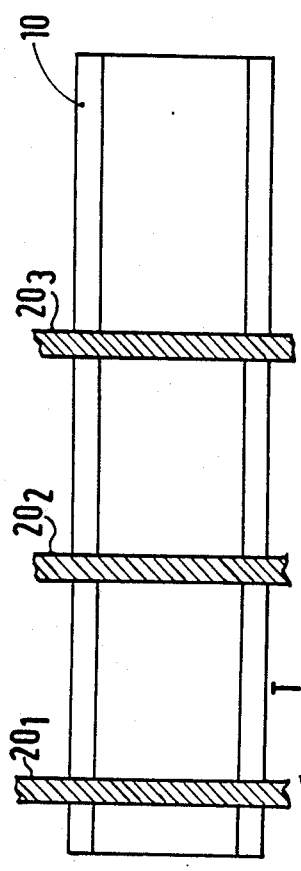
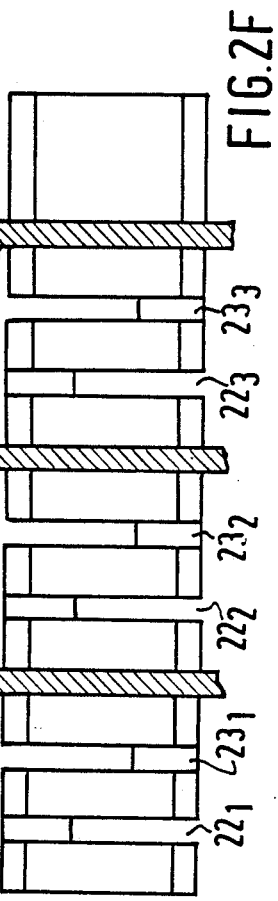
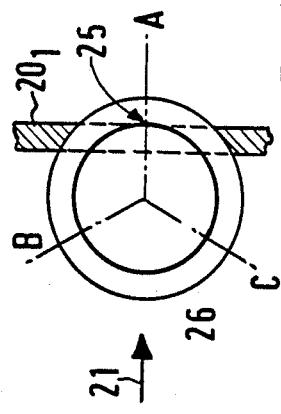
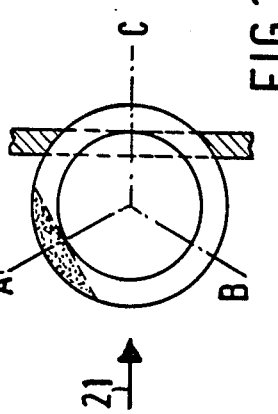
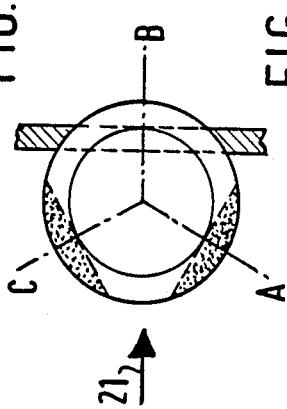

METHOD OF MANUFACTURING A SPRING OF THE CYLINDRICAL TYPE TO BE USED AT HIGH TEMPERATURE

This application s a continuation application of U.S. patent application Ser. No. 921,925, filed Oct. 20, 1986 now abandoned and all benefits for such earlier application are hereby claimed for this new continuation application.

The invention relates to a method of manufacturing a spring of the cylindrical type to be used at high temperatures and having recesses not adjoining each other with the recess being of a height h, which recesses are formed in cylindrical tube, and are spaced apart by a distance e to be substantially at right angles to the axis of the cylindrical tube with these recesses being distributed in the tube along a helical line and with each recess being constituted by a cylinder of the height h, and having a generatrix displaced parallel to the axis of the tube along a closed curve formed by a part of the contour of a substantially transverse section of the cylindrical tube and comprising a portion of the contours corresponding to the internal and external surfaces of the cylindrical tube with the closed curve being subjected for two adjacent recesses to a rotation with respect to the axis of the cylindrical tube.

BACKGROUND OF THE INVENTION

A spring of this type is known from the French Patent No. 1,090,004, which discloses a spring constituted by a rod of an elastic material axially provided with a longitudinal hole merging at at least one of the ends and in which incisions are provided forming transverse gaps which merge into the longitudinal hole with these gaps being shifted with respect to each other in the longitudinal and peripheral direction in such a manner that at least a series of elastic blades is left between them, which are interconnected zigzagwise.

Such a spring has to be thermally treated before being machined in order to avoid deformation due to the treatment and to obtain very accurate dimensions and the possibility of machining the ends, all this with good characteristics with respect to the quality of the elastic material. This spring can be made of steel, of bronze, of superpolyamide or of caoutchouc or rubber, with a milling operation being carried out on these materials.

Now the temperatures at which such springs can operate are just below 500° C. and the latter cannot in any case fulfil the function of a spring operating at high temperatures, for example, at temperatures exceeding 1000° C.

On the other hand, the applications which require the use of springs operating at high temperatures lie, for example, in the field of semiconductor metallurgy. Now in such an application, the problem of pollution of the environment in which the springs operate is of major importance and the materials described in French Patent No. 1,090,004 are not adapted to this use. A change of materials is imposed and a choice has to be made among refractory materials, such as quartz, boron nitride and graphite. However, the milling operation used according to this document does not permit obtaining an elastic element that can fulfil the function of a spring. In fact, these milling operations generate microcracks mainly in the zones in which the elasticity of the material is applied, while fractures appear in the elements obtained, which render the elements thus formed unsuitable for any function of a spring operating at high temperature.

SUMMARY OF THE INVENTION

The invention therefore has for its object to provide a method of manufacturing a spring that can be used at high temperatures.

For this purpose, the invention as defined in the preamble is characterized in that in a cylindrical tube of a non-metallic refractory material:

an operation of partially sawing the tube is carried out in a direction corresponding to a substantially transverse section of the tube by means of a wire saw having at least one wire in order to obtain at least one recess of the tube with the partial sawing operation being stopped after having traversed the entire hollow part of the tube and with the width of the wire corresponding and substantially to the required hight of the recess, - the tube is displaced with respect to the wire of the saw according to a rotation with respect to the axis of the tube through an angle of 360°/n and a translation parallel to the axis of the tube over a distance T/n, where T represents the distance or pitch between the consecutive recesses situated on the same generatrix and n represents the number of recesses to be formed in the tube over the distance T, and the sawing operation, and then the displacement operation, are repeated until a spring of a non-metallic refractory material is obtained having the required number of recesses and the required length.

The non-metallic refractory material may be quartz, graphite or boron nitride. Preferably, the cross-section of the hollow cylindrical tube is annular. The ratio h/e may be substantially equal to 1 e being the spacing between two neighbouring recesses equal to the thickness of the zone remaining therebetween.

In semiconductor metallurgy, it is very often necessary to carry out operations of movement within a closed space, in which a given number of states of equilibrium of pressure, temperature and chemical composition prevail. The transfer of movements or forces is found to be difficult, although the amplitudes thereof are generally small.

In order to solve this problem, the spring according to the invention s preferably formed in a tube whose cross-section is annular. The recesses are thus obtained according to a cold technique, which does not give rise to disturbances, such as micro-cracks or the like with the disturbed zone along the cut surface being of very small thickness. These recesses are provided substantially along a transverse section. After having traversed the first face of the internal surface of the cylindrical tube, the recesses are preferably level with the second face.

Adjacent recesses are arranged at the distance e from each other and shifted by rotation with respect to the axis of the cylindrical tube in such a manner that all the recesses formed in the tube succeed each other in a helical distribution. Several recesses are consequently arranged on the same generatrix at a distance or pitch T such that n=T/h+e. Over the distance T there are consequently n successive recesses, which are shifted by rotation through an angle of 360°/n.

In order to obtain such a spring, use is preferably made of a multiwire saw, having wires located at a relative separation distance T. Thus, all the recesses at the relative distance T are formed simultaneously. Subsequently, the quartz tube is rotated on its support through an angle of 360°/n and again all the recesses at the relative distance T are obtained. The operation is effected for n rotations. Alternatively, a laser may be used to the extent to which the disturbed zone along the cutting edge is not too wide taking into account the thickness e of the remaining zone.

In order that the invention may be readily carried out, it will now be described more fully by way of example with reference to the accompanying drawing, in which:

BRIEF DESCRIPTION OF THE DRAWINGS

FIGS. 2A to 2F illustrate the cutting of a cylindrical tube and the spring according to the invention thus obtained with n=3.

DESCRIPTION OF THE INVENTION

Figure 1:
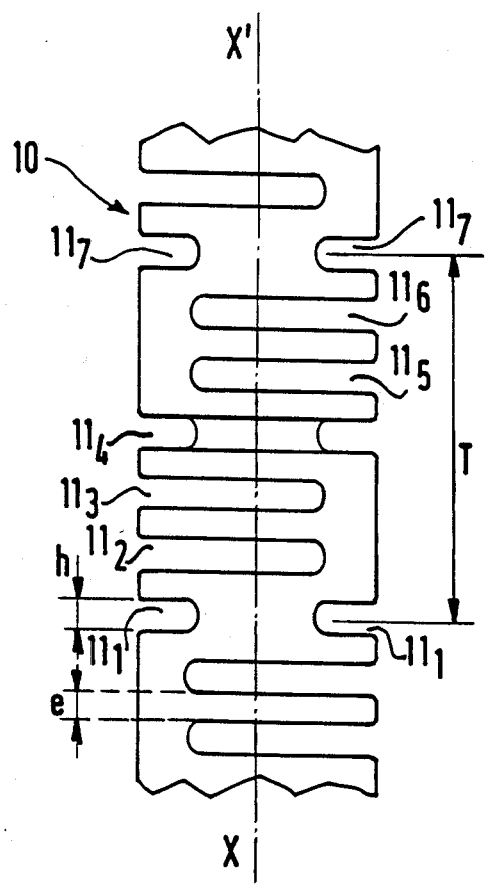
FIG. 1 shows a spring part according to the invention.

FIG. 1 shows a spring 10 obtained in a cylindrical quartz tube in the case of a spring having a pitch T with a number n of six recesses $11_1$ to $11_6$. The recesses $11_1$ and $11_7$ are analogous and are located at the relative distance T. The recesses are spaced apart by a distance corresponding to the thickness of the remaining part e and are shifted by rotation with respect to the axis X-X' through an angle of 360°/6=60° in the embodiment shown. The height of each recess is h.

FIGS. 2A to 2F show a preferred method of realizing the invention in the case of a pitch T with a number n of three recesses for the sake of simplicity of the drawing. For this purpose, a multiwire saw is used comprising, for example, three wires $20_1$, $20_2$, $20_3$ at a relative separation distance T from each other. The thickness of the wires is substantially equal to the height h. Three cuts are effected ($22_1$, $22_2$, $22_3$), the direction of penetration being indicated by the arrow 21. The cuts are effected until the wires are level with the inner wall 25, that is to say after having traversed the entire hollow zone 26 of the cylindrical tube.

In order to obtain a pitch T with a number n of three recesses, the tube is then rotated with respect to its axis through an angle of 360°/3=120° the positions of the letters A, B, C illustrating this rotation. The three wires are then displaced along the longitudinal axis of the tube over a distance T/3 and three new recesses are formed ($23_1$, $23_2$, $23_3$). The operations of rotation and translation similar to the preceding operations are again carried out, whereupon three further recesses are formed.

In the most general case for a pitch T comprising n recesses, each step of rotation is equal to 360°/n and each step of translation of each wire is equal to T/n.

Figures 3A, 3B, 3C:
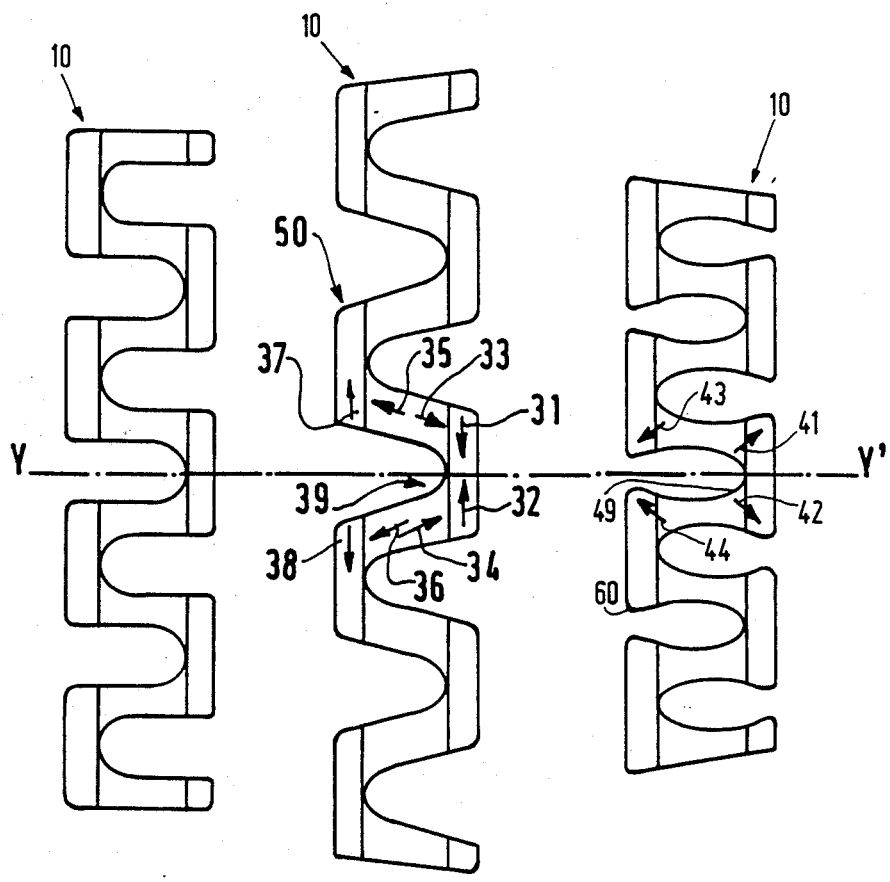
FIGS. 3A to 3C represent in simplified form a sectional view along the axis of symmetry of the tube of a spring according to the invention.

FIGS. 3A to 3C show a sectional view along the axis of symmetry of the tube of a spring according to the invention, but represented to simplify the drawing, for a spring having a pitch T with a number n of two recesses. This structure is considerably simplified, but permits visualizing more clearly the forces applied. The sectional view of FIG. 3A shows a part of a spring in the rest position. Considering displacements effected with respect to a central turn centered on the axis Y-Y', according to FIG. 3B, a spring in the expanded state is obtained, while according to FIG. 3C a spring is obtained in the compressed state. In these two cases, the directions of the forces applied, which are symmetrical to the axis Y-Y', are observed on the central turn. The forces indicated by the arrows 31 and 33 in FIG. 3B act to perform a compression together with the forces indicated by the arrows 32 and 34. The forces indicated by the arrows 35 and 37 act to perform an expansion together with the forces indicated by the arrows 36 and 38. The composition of these forces reveals that a spring structure having sharp corners is less satisfactory than a structure having rounded corners. For this reason, the bottom of each recess, for example 39, preferably must have a rounded structure. This is readily obtained by a cut carried out by means of a wire saw according to the invention.

For the same reasons, the outer edges of each recess, such as 50, preferably have a rounded structure. This can be obtained by carrying out a local chemical etching treatment effected after the recesses have been formed.

The sectional view according to FIG. 3C shows the same spring in compressed state with other directions of the forces 41, 42, 43 and 44 applied. In this case also, the preferred structure is that having rounded corners 49 and 60.

The sectional views as shown in FIGS. 3A to 3C represent a simplified example. The same mechanisms of equilibrium of forces are obtained, but in a much more complex manner, in springs according to the invention with a number of recesses larger than two per pitch.

Figure 4:
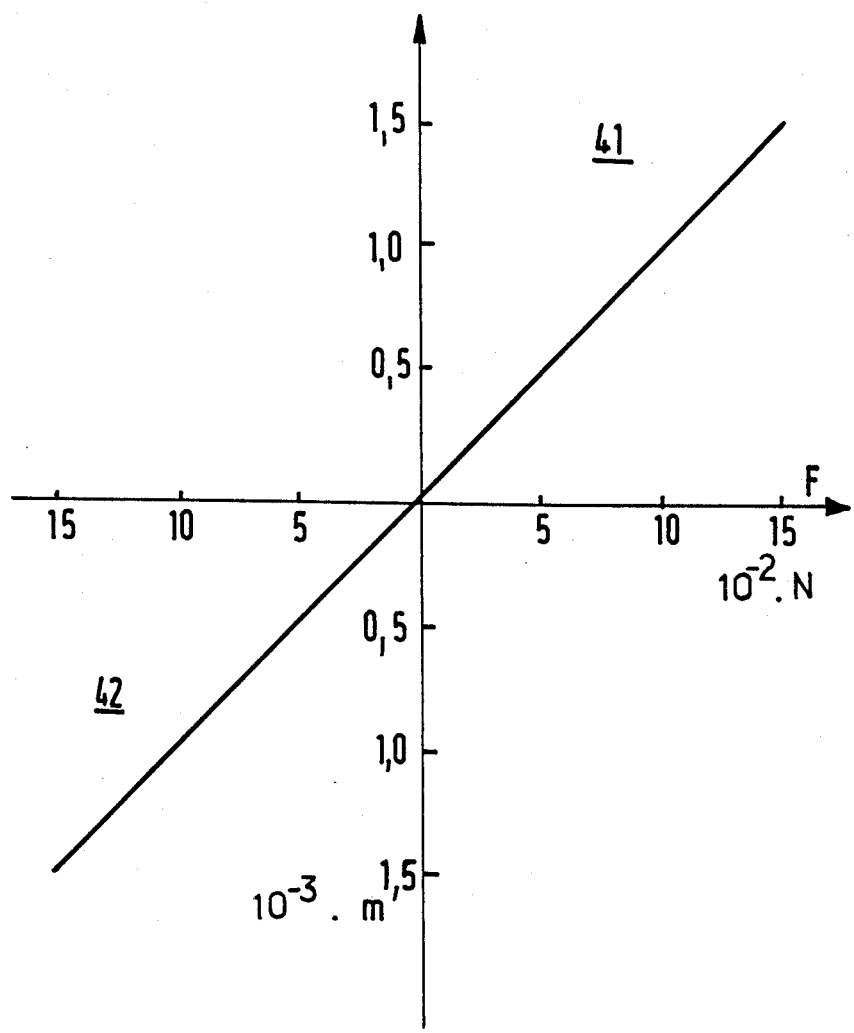
FIG. 4 shows a compression expansion curve as a function of the force applied.

FIG. 4 shows the excursion curve of compression-expansion as a function of the applied force for a quartz spring according to the invention, and in particular for a spring having the following geometric characteristics:
  length: 20 mm
  number n of recesses: 26
  pitch T: 2.25 mm
  height h of recesses: 0.2 mm
  distance e between cuts: 0.548 mm
  diameter d: 18 mm
  wall thickness: 1 mm The excursion curve as a function of the force is substantially linear. Its inclination is about $10^{-2}$ m/N. The spring operates satisfactorily both in the compressed state (zone 41) and in the expanded state (zone 42). This spring can also support small torsoinal forces.

The ratio between the height of the cut h and the distance e between two consecutive cuts can lie in a wide range of values in accordance with the respective dimensions of h and e.

The most characteristic extreme situations exist for the low and the high values of h and e.

For the low values, it is possible to obtain a spring with the values h≈e≈50 μm, for which the ratio h/e is substantially equal to 1. The method of cutting involves only a few disturbances, in the cutting zone, which permits of maintaining for the material between two recesses a satisfactory intrinsic quality for the use aimed at. In fact, for a small thickness of the material left, microcracks would make it impossible to obtain a spring.

For the high values, the distance e having no particular limit, the choice of the value h can also be very wide. It is possible to use wires provided with an abrasive having a diameter of several millimeters and to form wide recesses to permit obtaining springs of large dimensions. The technique of sawing can be correctly adapted to these extreme conditions and permits obtaining in an economical manner springs of a non-metallic refractory material.

The springs of a non-metallic refractory material just described can be used for applications which require the transfer or the absorption of forces of small amplitude in conditions of high temperature, such as for example, for compensating the expansions of movable parts. Such a spring can be used at temperatures exceeding 1000° C. when it is made of quartz, of graphite or of boron nitride, while maintaining its elastic basic properties. Thus, it is possible to obtain a spring with a material in the amorphous state having qualities analogous to those of a metallic spring, but adapted to high temperatures.

In these situations of high temperature, the spring also has the interesting property that it practically does not supply vapour by evaporation of its constitutive material, which permits of using it in atmospheres requiring good conditions of cleanness.

Consequently, it can be used in the mechanics of high temperatures, in semiconductor metallurgy, in transmission of movements in a vacuum at high temperatures, etc.

What is claimed is:

1. A method of manufacturing a cylindrical type spring for use at high temperatures comprising the steps of
   providing a hollow substantially cylindrical tube formed solely of a non-metallic refractory material;
   partially cutting said hollow substantially cylindrical tube with at least one wire in a direction transverse to a longitudinal axis of said cylindrical tube, said step of cutting being carried out by sawing said at least one wire through a cylindrical side of said tube, and through a hollow space of said cylindrical tube until a leading edge of said at least one wire is substantially touching an inner wall of said hollow cylindrical wall at a side of said tube opposite to initial sawing by said least one wire, and withdrawing said at least one wire from said cylindrical tube;
   rotating said cylindrical tube by an angle equal to 360°/n, where n equals a number of recesses to be cut into said cylindrical tube, and moving said cylindrical tube a distance T/n in the longitudinal direction of said cylindrical tube, where T equals a distance or pitch between two successive recesses;
   again partially cutting said cylindrical tube with said at least one wire at said distance T/n and at said angle 360°/n through said cylindrical tube and through said hollow space until said leading edge is substantially touching the opposite said inner wall, and withdrawing said at least one wire from said cylindrical tube; and
   repeating said steps of rotating, moving, again partially cutting, and withdrawing until n recesses have been cut into said cylindrical tube.

2. A method according to claim 1, wherein said at least one wire for carrying out said steps of sawing is a multiwire structure having a plurality of wires in parallel disposition.

3. A method according to claim 1 or claim 2, wherein said at least one wire forms said recesses with a rounded bottom.

4. A method according to claim 1, or claim 2, wherein said non-metallic refractory material is quartz.

5. A method according to claim 1 or claim 2, wherein said non-metallic refractory material is boron nitride.

6. A method according to claim 1 or claim 2, wherein said non-metallic refractory material is graphite.

7. A method according to claim 1 or claim 2, wherein said spring is used at temperatures exceeding 1000° C.

8. A spring structure comprising
   a hollow substantially cylindrical tube formed solely of a non-metallic refractory material, said cylindrical tube having a plurality of n recesses extending transversely through sides of said cylindrical tube and a hollow interior space to inner surfaces of said cylindrical tube, said recesses having a dimension h along a longitudinal axis of said cylindrical tube, and said recesses being rotated from one another about said cylindrical tube by an angle 360°/n, said recesses being separated from one another along an exterior surface of said cylindrical tube parallel to said longitudinal axis by a distance e, said plurality of n recesses repeating one another over a distance T parallel to said longitudinal axis with successive recesses being separated by a distance T/n parallel to said longitudinal axis where e equals T/n.

9. A spring structure according to claim 8, wherein said non-metallic refractory material is quartz.

10. A spring structure according to claim 8, wherein said non-metallic refractory material is boron nitride.

11. A spring structure according to claim 8, wherein said non-metallic refractory material is graphite.

12. A spring structure according to claim 8, claim 18, claim 19, or claim 20, wherein said dimension h has a ratio h/e to said distance e equal to approximately 1.

13. A spring structure according to claim 8, claim 9, claim 10 or claim 11, wherein said cylindrical tube has an annular cross-section.

14. A spring structure according to claim 8, claim 9, claim 10, or claim 11, wherein said spring is used at temperatures exceeding 1000° C.

* * * * *